US011949844B2

(12) United States Patent
Li

(10) Patent No.: US 11,949,844 B2
(45) Date of Patent: Apr. 2, 2024

(54) IMAGE DATA PROCESSING METHOD AND APPARATUS, IMAGE PROCESSING CHIP, AND AIRCRAFT

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 267 days.

(21) Appl. No.: 17/490,635

(22) Filed: Sep. 30, 2021

(65) Prior Publication Data

US 2022/0103799 A1 Mar. 31, 2022

Related U.S. Application Data

(63) Continuation of application No. PCT/CN2020/083769, filed on Apr. 8, 2020.

(51) Int. Cl.

*G06K 9/00* (2022.01)
*B64C 39/02* (2023.01)
*H04N 13/128* (2018.01)
*H04N 13/15* (2018.01)
*H04N 13/156* (2018.01)
(Continued)

(52) U.S. Cl.

CPC ........... *H04N 13/15* (2018.05); *B64C 39/024* (2013.01); *H04N 13/128* (2018.05); *H04N 13/156* (2018.05); *H04N 13/204* (2018.05); *B64U 2101/30* (2023.01)

(58) Field of Classification Search

CPC ....................................................... H04N 13/15
See application file for complete search history.

(56) References Cited

U.S. PATENT DOCUMENTS

2012/0113227 A1* 5/2012 Paik ........................ H04N 23/67 348/E13.064
2013/0294684 A1* 11/2013 Lipton .................... G06T 15/00 382/154
(Continued)

FOREIGN PATENT DOCUMENTS

CN 103220545 A 7/2013
CN 103957398 A 7/2014
(Continued)

OTHER PUBLICATIONS

The International Search Report dated Jul. 6, 2020; PCT/CN2020/083769 English Translation.

*Primary Examiner* — Hadi Akhavannik

(57) ABSTRACT

Embodiments of the present invention relate to the technical field of image processing, and disclose an image data processing method and apparatus, an image processing chip, and an aircraft. The method comprises: receiving K channels of image data; performing splitting processing on the L channels of second image data in the K channels of image data to obtain M channels of third image data; performing format conversion processing on the (N−M) channels of first image data and the M channels of third image data to obtain a color image in a preset format; and performing image processing on a gray part component of the color image in the preset format to obtain a depth map. The method can better meet the requirements of multi-channel image data processing.

18 Claims, 6 Drawing Sheets

Receive K channels of image data — 301

Perform splitting processing on the L channels of second image data in the K channels of image data to obtain M channels of third image data — 302

Perform format conversion processing on the (N-M) channels of first image data and the M channels of third image data to obtain a color image in a preset format — 303

Perform image processing on a gray part component of the color image in the preset format to obtain a depth map — 304

(51) Int. Cl.
*H04N 13/204* (2018.01)
*B64U 101/30* (2023.01)

(56) References Cited

U.S. PATENT DOCUMENTS

| | | | | |
|---|---|---|---|---|
| 2015/0201178 | A1* | 7/2015 | Lakshminarayanan | H04N 19/187 348/43 |
| 2017/0078559 | A1* | 3/2017 | Christopher | G06T 7/571 |
| 2018/0325618 | A1* | 11/2018 | Justin | A61B 90/37 |
| 2019/0043257 | A1* | 2/2019 | Kirk | H04N 19/00 |
| 2021/0243425 | A1* | 8/2021 | Liu | G06T 7/30 |

FOREIGN PATENT DOCUMENTS

| | | | |
|---|---|---|---|
| CN | 104427218 | A | 3/2015 |
| CN | 107005657 | A | 8/2017 |
| CN | 107026959 | A | 8/2017 |
| CN | 107972582 | A | 5/2018 |
| CN | 109041591 | A | 12/2018 |
| CN | 109496328 | A | 3/2019 |
| CN | 110009595 | A | 7/2019 |
| WO | WO2016149037 | A1 | 9/2016 |

* cited by examiner

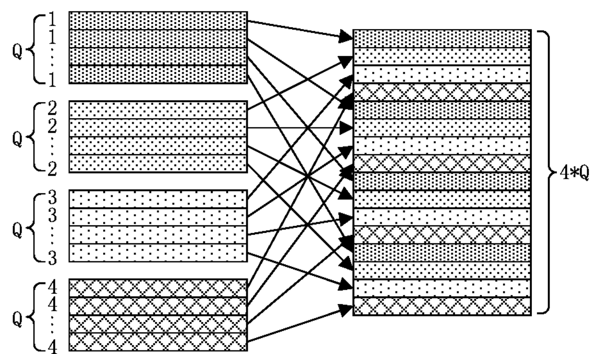
FIG. 5
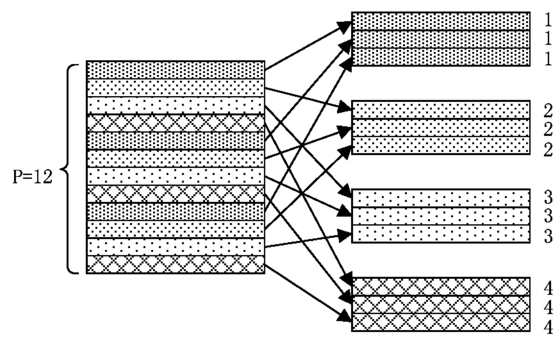
FIG. 6
j = 1 2 3 4 5 6 7 8 9
i=1 G R G R G R G R G R G R
i=2 B G B G B G B G B G B G
i=3 G R G R G R G R G R G R
i=4 B G B G B G B G B G B G
i=5 G R G R G R G R G R G R
i=6 B G B G B G B G B G B G
i=7 G R G R G R G R G R G R
i=8 B G B G B G B G B G B G
FIG. 7

IMAGE DATA PROCESSING METHOD AND APPARATUS, IMAGE PROCESSING CHIP, AND AIRCRAFT

The present application is a continuation of the International Application No. PCT/CN2020/083769, filed on Apr. 8, 2020, which claims priority of Chinese patent No. 201910294084.7, filed on Apr. 12, 2019, both of which are hereby incorporated by reference in their entireties.

AIRCRAFT TECHNICAL FIELD

The present disclosure generally relates to the technical field of image processing, and in particular, to an image data processing method and apparatus, an image processing chip, and an aircraft.

BACKGROUND

Image data processing technology is an emerging technology that emerged, developed, and matured in the 1960s with the development of computer technology and VLSI (Very Large Scale Integration). The image data processing technology may use various means to process image data according to requirements. In recent years, the image data processing technology has become increasingly mature, and has been widely used in aerospace, military, biomedicine, artificial intelligence and other fields. For example, in the field of aerial photography of aircrafts such as unmanned aerial vehicles, images acquired by cameras, video cameras and other devices are processed by the image data processing technology to obtain images that meet various needs.

With the application and popularization of the image data processing technology, the requirements for the performance of image data processed by the technology are getting higher and higher, for example, it is required to process multi-channel image data. However, due to the limitations of a chip used to process image data, such as the image processing chip itself, the number of channels of image data that the chip can receive is limited, so it can not meet the requirements of multi-channel image data processing. For example, when the number of channels of image data to be processed is greater than the number of channels of image data that can be received by the chip, because the maximum number of channels of image data that the chip can receive is exceeded, the chip can not obtain the multi-channel image data completely, which leads to the inability to process the multi-channel image data, which has a great impact on the implementation of functions related to image data processing in the chip, and even leads to the inability to implement the related functions.

Therefore, how to better meet the requirements of multi-channel image data processing has become an urgent problem to be solved.

SUMMARY

Embodiments of the present invention provide an image data processing method and apparatus, an image processing chip, and an aircraft, which can better meet the requirements of multi-channel image data processing.

The embodiments of the present invention disclose the following technical solutions.

In a first aspect, an embodiment of the present invention provides an image data processing method for processing N channels of a first image data acquired by N image acquisition devices, the method includes:

receiving K channels of image data, wherein the K channels of image data include L channels of second image data obtained by combining M channels of first image data of the N channels of first image data and (N−M) channels of first image data in the N channels of first image data that have not undergone combining processing, and K<N;

performing splitting processing on the L channels of second image data in the K channels of image data to obtain M channels of third image data;

performing format conversion processing on the (N−M) channels of first image data and the M channels of third image data to obtain a color image in a preset format; and performing image processing on a gray part component of the color image in the preset format to obtain a depth map.

Optionally, K is less than or equal to a maximum number of input channels of image data that can be supported.

Optionally, the L channels of second image data include: a first channel of second image data, a second channel of second image data, . . . , and an $L^{th}$ channel of second image data; and performing splitting processing on the L channels of second image data in the K channels of image data includes:

separately performing the splitting processing on the first channel of second image data, the second channel of second image data, . . . , and the $L^{th}$ channel of second image data row by row, where each channel of second image data is split into M/L channels of third image data.

Optionally, the first channel of second image data is split into a first channel of third image data, a second channel of third image data, . . . , and an $(M/L)^{th}$ channel of third image data, and the first channel of second image data includes P rows of image data; and performing the splitting processing on the first channel of second image data row by row includes:

disassembling a first row of image data, a second row of image data, . . . , and an $(M/L)^{th}$ row of image data of the first channel of second image data into a first row of the first channel of third image data, a first row of the second channel of third image data, . . . , and a $1^{st}$ row of the $(M/L)^{th}$ channel of third image data, respectively; disassembling an $(M/L+1)^{th}$ row of image data, an $(M/L+2)^{th}$ row of image data, . . . , and $(2*M/L)^{th}$ row of image data of the first channel of second image data into a second row of the first channel of third image data, a second row of the second channel of third image data, . . . , and a second row of the $(M/L)^{th}$ channel of third image data, respectively; and performing the operation by analogy, until a $(P-M/L+1)^{th}$ row of image data, a $(P-M/L+2)^{th}$ row of image data, . . . , and a $P^{th}$ row of image data of the first channel of second image data is disassembled into a $(P/(M/L))^{th}$ row of the first channel of third image data, a $(P/(M/L))^{th}$ row of the second channel of third image data, and a $(P/(M/L))^{th}$ row of the $(M/L)^{th}$ channel of third image data, respectively. Optionally, the preset format includes: a YUV format.

Optionally, the first image data and the third image data are both images in an RGB format, and a calculation formula of the gray part component of the color image in the preset format is:

$$Y=((66*R+129*G+25*B+128)/256+16)*16$$

where R is an intensity of a red component of the image in the RGB format, G is an intensity of a green component of the image in the RGB format, and B is an intensity of a blue component of the image in the RGB format.

In a second aspect, an embodiment of the present invention provides an image data processing apparatus for processing N channels of first image data acquired by N image acquisition devices, the apparatus including:

a receiving module, configured to receive K channels of image data, where the K channels of image data include L channels of second image data obtained by combining M channels of first image data of the N channels of first image data and (N-M) channels of first image data in the N channels of first image data that have not undergone combining processing;

a splitting processing module, configured to perform splitting processing on the L channels of second image data in the K channels of image data to obtain M channels of third image data;

a format conversion module, configured to perform format conversion processing on the (N−M) channels of first image data and the M channels of third image data to obtain a color image in a preset format; and a depth map obtaining module, configured to perform image processing on a gray part component of the color image in the preset format to obtain a depth map.

Optionally, K is less than or equal to a maximum number of input channels of image data that can be supported.

Optionally, the L channels of second image data include: a first channel of second image data, a second channel of second image data, . . . , and an $L^{th}$ channel of second image data; and the splitting processing module is further configured to:

separately perform the splitting processing on the first channel of second image data, the second channel of second image data, . . . , and the $L^{th}$ channel of second image data row by row, to obtain the M channels of third image data, where each channel of second image data is split into M/L channels of third image data.

Optionally, the first channel of second image data is split into a first channel of third image data, a second channel of third image data, . . . , and an $(M/L)^{th}$ channel of third image data, and the first channel of second image data includes P rows of image data; and the splitting processing module performing the splitting processing on the first channel of second image data row by row includes:

disassembling a first row of image data, a second row of image data, . . . , and an $(M/L)^{th}$ row of image data of the first channel of second image data into a first row of the first channel of third image data, a first row of the second channel of third image data, . . . , and a first row of the $(M/L)^{th}$ channel of third image data, respectively; disassembling an $(M/L+1)^{th}$ row of image data, an $(M/L+2)^{th}$ row of image data, . . . , and $(2*M/L)^{th}$ row of image data of the first channel of second image data into a second row of the first channel of third image data, a second row of the second channel of third image data, . . . , and a second row of the $(M/L)^{th}$ channel of third image data, respectively; and performing the operation by analogy, until a $(P-M/L+1)^{th}$ row of image data, a $(P-M/L+2)^{th}$ row of image data, . . . , and a $P^{th}$ row of image data of the first channel of second image data is disassembled into a $(P/(M/L))^{th}$ row of the first channel of third image data, a $(P/(M/L))^{th}$ row of the second channel of third image data, and a $(P/(M/L))^{th}$ row of the $(M/L)^{th}$ channel of third image data, respectively.

Optionally, the preset format includes: a YUV format.

Optionally, the first image data and the third image data are both images in an RGB format, and a calculation formula of the gray part component Y of the color image in the preset format is:

$$Y=((66*R+129*G+25*B+128)/256+16)*16$$

where R is an intensity of a red component of the image in the RGB format, G is an intensity of a green component of the image in the RGB format, and B is an intensity of a blue component of the image in the RGB format.

In a third aspect, an embodiment of the present invention further provides an image processing chip, including:

at least one processor; and a memory in communication connection with the at least one processor, where the memory stores instructions capable of being executed by the at least one processor, and the instructions, when executed by the at least one processor, cause the at least one processor to perform the image data processing method described above.

In a fourth aspect, an embodiment of the present invention provides an aircraft, including a vehicle body, and further including N image acquisition devices disposed on the vehicle body and an image processing chip disposed in the vehicle body, where the image processing chip is connected to the N image acquisition devices, the N image acquisition devices are configured to acquire N channels of first image data, and the image processing chip is the image processing chip according to the above-mentioned embodiments.

Optionally, the N image acquisition devices include: two parallel-mounted front-view lenses, two parallel-mounted down-view lenses, two parallel-mounted rear-view lenses, two parallel-mounted up-view lenses, two parallel-mounted left-view lenses, and two parallel-mounted right-view lenses.

Optionally, the image processing chip receiving K channels of image data includes:

receiving four channels of first image data that are acquired by the two parallel-mounted front-view lenses and the two parallel-mounted down-view lenses and have not undergone combining processing; and receiving one channel of second image data obtained by combining data acquired by the two parallel-mounted rear-view lenses and the two parallel-mounted up-view lenses; and receiving one channel of second image data obtained by combining data acquired by the two parallel-mounted left-view lenses and the two parallel-mounted right-view lenses.

Optionally, the aircraft further includes L combining modules, input ends of the L combining modules are connected to M image acquisition devices configured to acquire M channels of first image output ends of the L combining modules are connected to the image processing chip, and the L combining modules are configured to combine N channels of first image data of the M channels of first image data.

Optionally, the L combining modules include a first combining module and a second combining module, an input end of the first combining module is connected to the two parallel-mounted rear-view lenses and the two parallel-mounted up-view lenses, an output end of the first combining module is connected to the image processing chip, an input end of the second combining module is connected to the two parallel-mounted left-view lenses and the two parallel-mounted right-view lenses, and an output end of the second combining module is connected to the image processing chip.

In a fifth aspect, an embodiment of the present invention provides a computer program product. The computer program product includes a computer program stored on a non-volatile computer-readable storage medium. The computer program includes program instructions, and the program instructions, when \executed by a computer, cause the computer to perform the image data processing method described above.

In a sixth aspect, an embodiment of the present invention provides a non-volatile computer-readable storage medium, storing computer-executable instructions, which are used for causing a computer to perform the image data processing method described above.

In the embodiment of the present invention, when receiving the N channels of first image data acquired by the N image acquisition devices, the received K (N>K) channels of image data include L channels of second image data obtained by combining M channels of first image data in the N channels of first image data, and after receiving the K channels of image data, splitting processing, format conversion, and other processing are performed on the L channels of second image data in the K channels of image data, so that when the number of channels of image data to be processed is greater than the number of channels of image data that can be received by the chip, the processing of the N channels of first image data can still be implemented, thereby better meeting the requirements of multi-channel image data processing and ensuring the implementation of the functions related to the image data processing.

BRIEF DESCRIPTION OF DRAWINGS

One or more embodiments are illustrated by the pictures in the corresponding accompanying drawings, which are not to be limiting to the embodiments, and elements having the same reference numerals in the accompanying drawings represent similar elements, and unless otherwise stated, the figures in the accompanying drawings are not to be scale limiting.

FIG. 5 is a schematic diagram of combining processing row by row according to an embodiment of the present invention;

FIG. 6 is a schematic flowchart of splitting processing row by row according to an embodiment of the present invention;

FIG. 7 is schematic diagram of conversion of an image in an RGB format to a color image in a YUV format according to an embodiment of the present invention;

DESCRIPTION OF EMBODIMENTS

The technical solutions of the embodiments of the present invention will be described below in combination with the accompanying drawings in the embodiments of the present invention. Apparently, the described embodiments are some of, but not all of, the embodiments of the present invention. Based on the embodiments in the present invention, all other embodiments obtained by those of ordinary skill in the art without making creative efforts fall within the scope of protection of the present invention.

In addition, the technical features involved in the embodiments of the present invention described below may be combined with each other as long as they do not conflict with each other.

Figure 1:
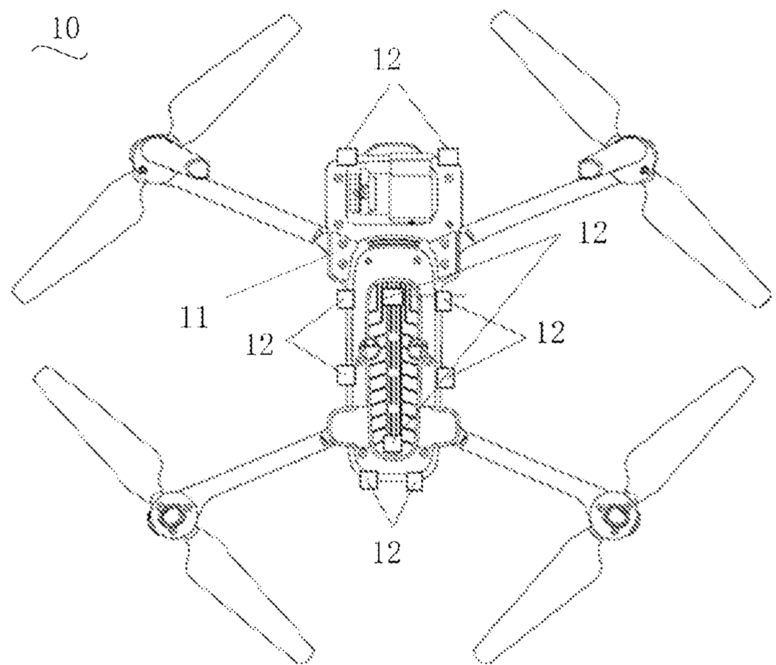
FIG. 1 is a schematic diagram of an application environment of an image data processing method according to an embodiment of the present invention, where the schematic diagram is a bottom view of an aircraft.
Figure 2:
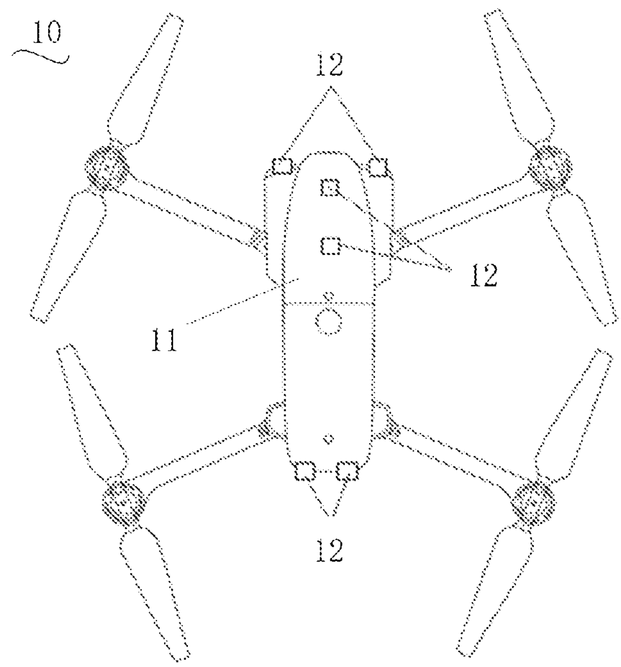
FIG. 2 is a schematic diagram of an application environment of an image data processing method according to an embodiment of the present invention, where the schematic diagram is a top view of an aircraft.

FIG. 1 and FIG. 2 are schematic diagrams of an application environment of an image data processing method according to an embodiment of the present invention. The application environment includes: an aircraft 10. The aircraft 10 includes a vehicle body 11, a plurality of image acquisition devices 12 disposed on the vehicle body 11, and an image processing chip (not shown) disposed in the vehicle body 11. The image processing chip is an execution body for executing the image data processing method.

The plurality of image acquisition devices 12 are connected to the image processing chip. The connection may be a communication connection to implement data interaction between the plurality of image acquisition devices 12 and the image processing chip.

For example, the plurality of image acquisition devices 12 are configured to acquire image data and through the communication connection, transmit the acquired image data to the image processing chip, so that the image processing chip processes the received image data.

The aircraft 10, as a flight carrier, is mainly configured to complete a designated task by flight, such as a flight task to a designated place, or a photography task of photographing during flight.

In addition, to ensure flight safety of the aircraft 10 during a flight process of the aircraft 10 is the premise for the aircraft 10 to complete the designated task. In the flight process of the aircraft 10, it is inevitable to encounter an obstacle, such as another aircraft, a tree, or a wire. To avoid a collision between the aircraft 10 and the various obstacles to reduce the probability of aircraft safety accidents and ensure the safety during flight, the obstacle avoidance capability is an essential capability of the aircraft 10, that is, an important index for evaluating the performance of the aircraft.

To avoid an obstacle by the aircraft 10, the first thing to be implement is to accurately measure a distance between the aircraft 10 and the obstacle. Only by measuring the distance within the dangerous range, can there be time to stop the forward action of the aircraft 10 before hitting the obstacle, thereby avoiding an accident.

Just like human beings or other animals in the process of moving forward, only by seeing an obstacle in front and roughly estimating the distance from the obstacle, can a human being or an animal decide a next behavior direction, so as to avoid a collision with the obstacle.

In addition, at present, the obstacle distance measuring methods widely used in the aircraft field include ultrasonic ranging, infrared or laser ranging, visual image detection, electronic map, and the like. The visual image detection technology makes use of the principle of how to estimate vision by human eyes, which is a technology favored in the aircraft field at present.

The visual image detection technology is a technology that uses machines instead of human eyes to measure and judge. In the application of distance measurement, visual image detection is mainly a measurement method that takes the image as a means or carrier to detect and transmit information. By extracting a feature signal of an image, actual information of a measured object is finally obtained from the image.

In a machine vision system for ranging, a captured target is converted into an image signal by a machine vision product (that is, an image acquisition apparatus, such as CMOS and CCD), and transmitted to a special image processing device or chip. The image processing device or chip obtains depth information according to pixel distribution, brightness, color, and other image information, so as to determine information of a distance between a aircraft and an obstacle. In addition, the characteristics of the target can be extracted by analysis and various operations, and the flight of the aircraft 10 can be controlled according to discrimination results, so as to realize the obstacle avoidance of the aircraft 10.

At present, in order to improve safety of the aircraft 10 as much as possible, it is generally required that the aircraft 10 can meet the requirement of omni-directional obstacle avoidance, that is, obstacle avoidance usually requires supporting six directions: front, bottom, rear, left, right, and top.

In addition, if a full vision solution is used, to meet the requirements of comprehensive obstacle avoidance, six pairs of or 12 image acquisition devices are usually needed, and if the main image acquisition device is added, a total of 13 image acquisition devices are needed. For example, the 12 image acquisition devices may include: two front-view lenses, two down-view lenses, two rear-view lenses, two up-view lenses, two left-view lenses, and two right-view lenses.

However, due to the limitations of the image processing device or chip itself, the number of channels of image data that the device or chip can receive is limited. Usually, the maximum number of input channels supported by an advanced chip is only about 8 channels, which is still far from meeting the requirements of omni-directional obstacle avoidance.

Based on this, in the embodiments of the present invention, in the omni-directional obstacle avoidance application, first, a plurality of image acquisition devices 12, for example, N image acquisition devices 12, acquire N channels of first image data and output the N channels of first image data; before the image processing chip receives the first image data, M channels of first image data in the N channels of first image data are combined by a combining module for implementing a combining function, to obtain L channels of second image data; the image processing chip receives a total of K>K) channels of image data, including the L channels of second image data and (N−M) channels of first image data in the N channels of first image data that have not undergone combining processing; and after receiving the K channels of image data, the image processing chip performs splitting processing, format conversion processing, and other processing on the L channels of second image data in the K channels of image data, so that when the number of channels of image data to be processed is greater than the number of channels of image data that can be received by the image processing chip, the processing of the N channels of first image data can still be implemented, thereby better meeting the requirements of multi-channel image data processing and ensuring the implementation of the functions related to the image data processing, that is, ensuring the implementation of comprehensive obstacle avoidance function, thereby improving the safety of the aircraft 10 during flight and reducing the probability of safety accidents.

It should be noted that the above-mentioned image acquisition devices 12 may be any suitable photosensitive elements or image sensors, for example, a Complementary Metal Oxide Semiconductor (CMOS), a Charge-coupled Device (CCD), or the like.

The plurality of image acquisition devices 12 may be identical image acquisition devices or may be different image acquisition devices in order to meet different requirements. For example, taking the comprehensive obstacle avoidance by the aircraft 10 as an example, the determining of the forward movement and downward landing distance of the aircraft 10 is usually the most important. Therefore, two front-view lenses and two down-view lenses adopt relatively high resolution lenses, such as 720P lenses, two rear-view lenses, two up-view lenses, two left-view lenses, and two right-view lenses adopt relatively low resolution lenses, such as VGA lenses.

The image processing chip may be any suitable chip capable of implementing the image data processing method, such as a microprocessor, a micro control unit, a single chip microcomputer, or a controller.

It should also be noted that the image data processing method provided by the embodiments of the present invention can be further extended to other suitable application environments, and is not limited to the application environment shown in FIG. 1. For example, in the process of practical application, it will be apparent to those skilled in the art that various types of aircrafts, such as unmanned aerial vehicles, unmanned ships or other movable apparatus, can be used without restriction for the aircraft 10 in this application environment.

For example, taking an unmanned aerial vehicle as an example, this image data processing method can be used for automatic obstacle avoidance for the unmanned aerial vehicle. An unmanned aerial vehicle is an aircraft with a task load and without a man, which is operated by a remote control device or self-provided program control apparatus. The unmanned aerial vehicle may be various types of unmanned aerial vehicles, for example, as shown in FIG. 1 and FIG. 2, the unmanned aerial vehicle may be a rotorcraft, for example, a multi-rotor aircraft propelled by a plurality of propulsion apparatuses through air. It can be understood that the embodiments of the present invention are not limited thereto, and the unmanned aerial vehicle may also be other types of unmanned aerial vehicles, such as a fixed-wing unmanned aerial vehicle, an unmanned airship, a parafoil unmanned aerial vehicle, or a flapping-wing unmanned aerial vehicle.

In addition, in some other application environments, the number of the image acquisition devices in the plurality of image acquisition devices 12 may be more or less, for example, 10, 11, 13, 14, or the like. That is, the number of image acquisition devices in the plurality of image acquisition devices 12 is not limited herein.

In addition, in some other application environments, the image data processing method may also be applied to other devices related to image processing, such as cell monitoring devices, vehicle monitoring devices, or robots, and is not limited to the aircraft described in the embodiments of the present invention.

Embodiment 1

Figure 3:
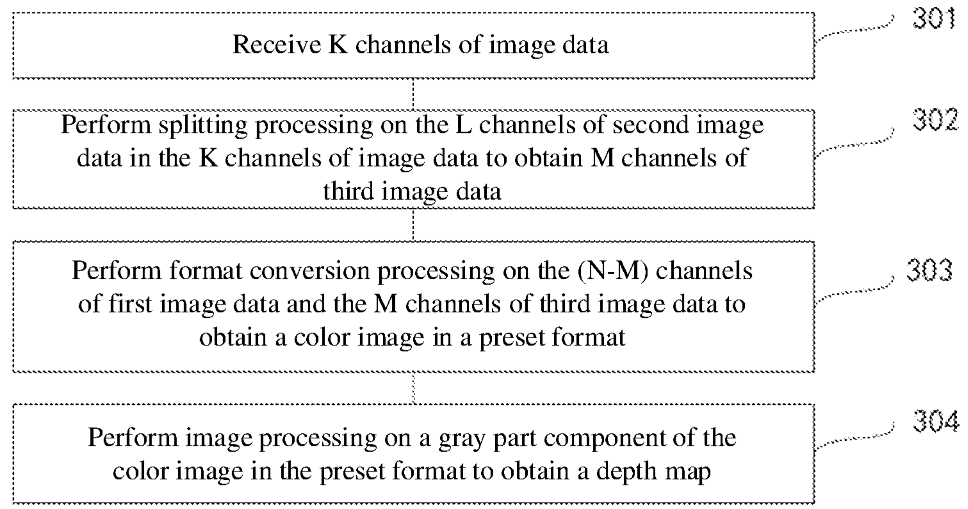
FIG. 3 is a schematic flowchart of an image data processing method according to an embodiment of the present invention.

FIG. 3 is a schematic flowchart of an image data processing method according to an embodiment of the present invention. The image data processing method is used for processing N channels of first image data acquired by N image acquisition devices. The image data processing method is applicable to various devices related to image processing, such as aircraft, cell monitoring devices, vehicle monitoring devices, or robots. The image data processing method may be performed by any suitable type of chip, such as the image processing chip of the aircraft described above. The aircraft may be any type of aircraft, such as an unmanned aerial vehicle, or an unmanned ship. The following takes an unmanned aerial vehicle as an example of the aircraft.

Referring to FIG. 3, the image data processing method includes the following.

In 301, K channels of image data are received.

The K channels of image data include L channels of second image data obtained by combining M channels of first image data of the N channels of first image data and (N−M) channels of first image data in the N channels of first image data that have not undergone combining processing, and K<N.

K, N, M, and L are all positive integers, and K=L+N−M. In addition, K is less than or equal to a maximum number of input channels of image data that can be supported.

It should be noted that specific values of K, N, M, and L are not limited herein, and can be set according to requirements in order to adapt to different image data processing requirements.

For example, taking the obstacle avoidance of a aircraft such as an unmanned aerial vehicle as an example, to implement the comprehensive obstacle avoidance of the unmanned aerial vehicle, obstacle avoidance usually requires supporting six directions: front, bottom, rear, left, right, and top. Therefore, six pairs of or 12 image acquisition devices are usually needed, that is, N=12 is desirable in this case.

Figure 4:
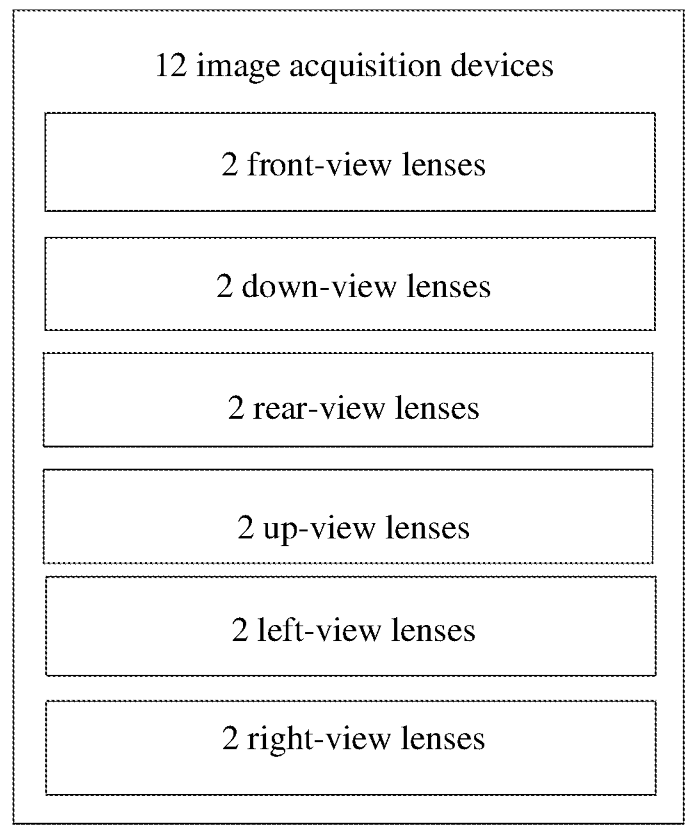
FIG. 4 is a schematic diagram of 12 image acquisition devices according to an embodiment of the present invention.

For example, as shown in FIG. 4, the 12 image acquisition devices include: two front-view lenses, two down-view lenses, two rear-view lenses, two up-view lenses, two left-view lenses, and two right-view lenses. The two front-view lenses, two down-view lenses, two rear-view lenses, two up-view lenses, two left-view lenses, and two right-view lenses are configured to acquire image data in corresponding directions.

However, due to the limitations of the image processing chip itself, the number of channels of image data that the device or chip can receive is limited. Usually, the most input channels supported by an advanced chip is only about 8 channels, that is, in this case, the maximum number of input channels of image data supported by the image processing chip can be 8, and the value range of K is K<8, for example, K=4, 5, 6, 7, or the like.

In addition, according to the actual situation of unmanned aerial vehicle obstacle avoidance, the number L of channels of image data to be combined can be determined. For example, for the comprehensive obstacle avoidance of the unmanned aerial vehicle, it is most important to judge forward motion and downward landing distances of the unmanned aerial vehicle. Therefore, before the image data is input to the image processing chip, the first image data acquired by the two rear-view lenses and the two up-view lenses are not combined, and the first image data acquired by the two rear-view lenses, the two up-view lenses, the two left-view lenses, and the two right-view lenses are combined. In this case, M=8.

In addition, the first image data acquired by the two rear-view lenses, the two up-view lenses, the two left-view lenses, and the two right-view lenses can be combined according to requirements. For example, the first image data acquired by the two rear-view lenses and the two up-view lenses are combined by the combining module to obtain one channel of second image data, and the first image data acquired by the two left-view lenses and the two right-view lenses are combined by the combining module to obtain one channel of second image data, that is, in this case, L=2.

After combining processing, the image processing chip may receive K channels of image data for subsequent image data processing. K channels of image data may be input to the image processing chip through K input devices, respectively. For example, six channels of image data are input to the image processing chip through six input devices.

The above-mentioned combining processing may be combining processing row by row which will be described in detail below with reference to FIG. 5.

As shown in FIG. 5, taking combining the first image data acquired by the two rear-view lenses and the two up-view lenses to obtain one channel of second image data as an example, it is assumed that the first image data acquired by the two rear-view lenses and the two up-view lenses each have Q rows, where Q is a positive integer. The specific value of Q is not limited herein, and can be set according to requirements in order to adapt to different image data processing requirements. For example, if Q=3, the combining process is as follows:

a first row of images of the first image data acquired by one of the two rear-view lenses is combined into a first row of the second image data, a first row of images of the first image data acquired by the other one of the two rear-view lenses is combined into a second row of the second image data, a first row of images of the first image data acquired by one of the two up-view lenses is combined into a third row of the second image data, and a first row of images of the first image data acquired by the other one of the two up-view lenses is combined into a fourth row of the second image data;

A second row of images of the first image data acquired by one of the two rear-view lenses is combined into a fifth row of the second image data, a second row of images of the first image data acquired by the other one of the two rear-view lenses is combined into a sixth row of the second image data, a second row of images of the first image data acquired by one of the two up-view lenses is combined into a seventh row of the second image data, and a second row of images of the first image data acquired by the other one of the two up-view lenses is combined into an eighth row of the second image data . . . ; and the operation is performed by analogy, until a $Q^{th}$ row of images of the first image data acquired by one of the two rear-view lenses is combined into a $(4*Q-3)^{th}$ row of the second image data, a $Q^{th}$ row of images of the first image data acquired by the other one of the two rear-view lenses is combined into a $(4*Q-2)^{th}$ row of the second image data, a $Q^{th}$ row of images of the first image data acquired by one of the two up-view lenses is combined into a $(4*Q-1)^{th}$ row of the second image data, and a $Q^{th}$ row of images of the first image data acquired by the other one of the two up-view lenses is combined into a $(4*Q)^{th}$ row of the second image data.

If the image size of each first image data acquired by the two rear-view lenses and the two up-view lenses is 640*480, the image size of one channel of second image data obtained by combining the first image data acquired by the two rear-view lenses and the two up-view lenses is 640*1920.

The first image data may be raw data. The raw data is unprocessed data, or may be understood as raw data used for an image acquisition apparatus to convert a captured light source signal into a digital signal.

In 302, splitting processing is performed on the L channels of second image data in the K channels of image data to obtain M channels of third image data.

The L channels of second image data may include: a first channel of second image data, a second channel of second image data, . . . , and an $L^{th}$ channel of second image data. The first channel of second image data, the second channel of second image data, . . . , and the $L^{th}$ channel of second image data represent the first channel of second image data to the $L^{th}$ channel of second image data.

the image processing chip performing splitting processing on the L channels of second image data in the K channels of image data includes: separately performing the splitting processing on the first channel of second image data, the second channel of second image data, . . . , and the $L^{th}$ channel of second image data row by row, where each channel of second image data is split into M/L channels of third image data.

For example, it is assumed that M=8 and L=2, one channel of second image data is split into four channels of third image data.

In some implementations, the first channel of second image data is split into a first channel of third image data, a second channel of third image data, . . . , and an $(M/L)^{th}$ channel of third image data.

In addition, the first channel of second image data includes P rows of image data. P is a positive integer, and a specific value of P is not limited herein, and can be set according to requirements in order to adapt to different image data processing requirements, for example, P=12.

The image processing chip performing splitting processing on the first channel of second image data row by row includes:

disassembling a first row of image data, a second row of image data, . . . , and an $(M/L)^{th}$ row of image data of the first channel of second image data into a first row of the first channel of third image data, a first row of the second channel of third image data, . . . , and a first row of the $(M/L)^{th}$ channel of third image data, respectively; disassembling an $(M/L+1)^{th}$ row of image data, an $(M/L+2)^{th}$ row of image data, . . . , and $(2*M/L)^{th}$ row of image data of the first channel of second image data into a second row of the first channel of third image data, a second row of the second channel of third image data, . . . , and a second row of the $(M/L)^{th}$ channel of third image data, respectively; and performing the operation by analogy, until a $(P-M/L+1)^{th}$ row of image data, a $(P-M/L+2)^{th}$ row of image data, . . . , and a $P^{th}$ row of image data of the first channel of second image data is disassembled into a $(P/(M/L))^{th}$ row of the first channel of third image data, a $(P/(M/L))^{th}$ row of the second channel of third image data, and a $(P/(M/L))^{th}$ row of the $(M/L)^{th}$ channel of third image data, respectively.

This splitting processing row by row is reverse to the combining processing row by row described above, and is described in detail with reference to FIG. 6.

As shown in FIG. 6, by an example in which P=12, M=8, and L=2, a process of the splitting processing row by row is:

disassembling a first row of image data, a second row of image data, . . . , and a fourth row of image data of the first channel of second image data into a first row of the first channel of third image data, a first row of the second channel of third image data, . . . , and a first row of the fourth channel of third image data, respectively; disassembling a fifth row of image data, a sixth row of image data, . . . , and an eight row of image data of the first channel of second image data into a second row of the first channel of third image data, a second row of the second channel of third image data, . . . , and a second row of the fourth channel of third image data, respectively; and performing the operation by analogy, until a ninth row of image data, a tenth row of image data, . . . , and a twelfth row of image data of the first channel of second image data is disassembled into a third row of the first channel of third image data, a third row of the second channel of third image data, and a third row of the fourth channel of third image data, respectively.

In 303, format conversion processing is performed on the (N−M) channels of first image data and the M channels of third image data to obtain a color image in a preset format.

The preset format may include a YUV format. The color image in the YUV format is divided into three components, respectively, a "Y" component, a "U" component, and a "V" component. The "Y" component represents luminance or luma, that is, a gray value; the "U" component and the "V" component represent chrominance or chroma, which is used to describe the color and saturation of the image and specify the color of the pixel.

The "Y" component of the color image in the YUV format is separated from the "U" component and the "V" component. If there is only the "Y" component without the "U" component and the "V" component, the image indicated in this way is a black-and-white gray image.

In some implementations, both the first image data and the third image data are images in an RGB format, that is, format conversion processing may be performed to convert an image in an RGB format into a color image in a YUV format.

A calculation formula for the gray part component Y in the color image in the preset format, that is, the "Y" component of the color image in the YUV format, is as follows:

$$Y=((66*R+129*G+25*B+128)/256+16)*16$$

where R is an intensity of a red component of the image in the RGB format, G is an intensity of a green component of the image in the RGB format, and B is an intensity of a blue component of the image in the RGB format.

Conversion of an image in the RGB format to a color image in the YUV format will be described in detail below with reference to FIG. 7.

As shown in FIG. 7, source data of the image in the RGB format is $S_{(i,j)}$, where i is the number of rows and j is the number of columns, the RGB YUV conversion method is as follows:

1) Odd rows and odd columns $G=S_{(i,j)}$ $R=(S_{(i,j-1)}+S_{(i,j+1)})/2$ $B=(S_{(i-1,j)}+S_{(i+1,j)})/2$ 2) Even rows and even columns:

$G=S_{(i,j)}$ $R=(S_{(i-1,j)}+S_{(i+1,j)})/2$ $B=(S_{(i,j-1)}+S_{(i,j+1)})/2$

3) Odd rows and even columns:

$R=S_{(i,j)}$ $B=(S_{(i-1,j-1)}+S_{(i-1,j+1)}+S_{(i+1,j-1)}+S_{(i+1,j+1)})/4$ $V=|S_{(i-2,j)}+S_{(i+2,j)}|$, $H=|S_{(i,j-2)}+S_{(i,j+2)}|$ if H<V, $G=(S_{(i,j-1)}+S_{(i,j+1)})/2$ if H>V, $G=(S_{(i-1,j)}+S_{(i+1,j)})/2$ if H=V, $G=(S_{(i,j-1)}+S_{(i,j+1)}++S_{(i+1,j)})/4$

4) Even rows and odd columns:

$B=S_{(i,j)}$ $R=(S_{(i-1,j-1)}+S_{(i-1,j+1)}+S_{(i+1,j-1)}+S_{(i+1,j+1)})/4$ $V=|S_{(i-2,j)}+S_{(i+2,j)}|$, $H=|S_{(i,j-2)}+S_{(i,j+2)}|$ if H<V, $G=(S_{(i,j-1)}+S_{(i,j+1)})/2$ if H>V, $G=(S_{(i-1,j)}+S_{(i+1,j)})/2$ if H=V, $G=(S_{(i,j-1)}+S_{(i,j+1)}+S_{(i-1,j)}+S_{(i+1,j)})/4$ finally, Y=((66*R+129*G+25*B+128)/256+16)*16.

In 304, image processing is performed on a gray part component of the color image in the preset format to obtain a depth map.

The depth map is an expression mode of three-dimensional scene information. A gray value of each pixel point of the depth map may be used to characterize a distance from an image acquisition device at a certain point in the scene corresponding to the acquired image data.

The image processing chip may include a depth map processing module, through which the gray part component of the color image in the preset format can be processed to obtain a depth map.

The depth map processing module uses a binocular stereo vision method to obtain a depth map. By using the binocular stereo vision method, two images of a same scene are simultaneously acquired through two image acquisition devices (such as two rear-view lenses) separated by a distance, corresponding pixels in two images are found by a stereo matching algorithm, and then parallax information is calculated according to the triangle principle. In addition, the parallax information, through transformation, can be used for representing the depth map of an object in the scene.

In an application of obstacle avoidance of an unmanned aerial vehicle, distance information between the unmanned aerial vehicle and an obstacle can be determined by using the depth map, so as to determine a subsequent flight direction and flight channel of the unmanned aerial vehicle and avoid a collision between the unmanned aerial vehicle and the obstacle.

It should be noted that for technical details not described in detail in step 301 to step 304 shown in the embodiments of the present invention, reference can be made to the specific description in the application scenario of the above image data processing method.

In the embodiments of the present invention, during receiving of the N channels of first image data acquired by the N image acquisition devices, the received K (N>K) channels of image data include L channels of second image data obtained by combining M channels of first image data in the N channels of first image data, and after receiving the K channels of image data, splitting processing, format conversion, and other processing are performed on the L channels of second image data in the K channels of image data, so that when the number of channels of image data to be processed is greater than the number of channels of image data that can be received by the chip, the processing of the N channels of first image data can still be implemented, thereby better meeting the requirements of multi-channel image data processing and ensuring the implementation of the functions related to the image data processing.

Embodiment 2

Figure 8:
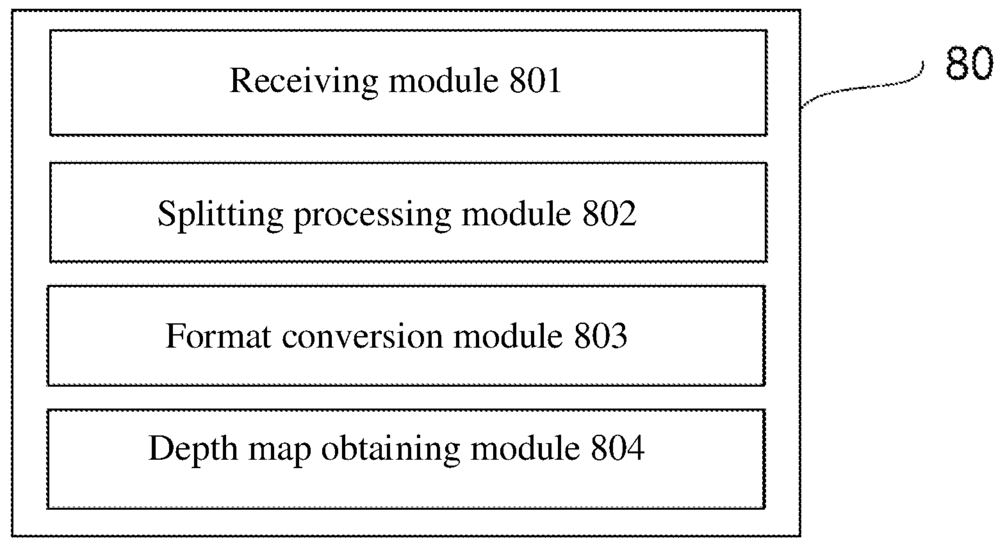
FIG. 8 is a schematic flowchart of an image data processing apparatus according to an embodiment of the present invention.

FIG. 8 is a schematic flowchart of an image data processing apparatus according to an embodiment of the present invention. The image data processing apparatus 80 is configured to process N channels of first image data acquired by N image acquisition devices. The image data processing apparatus 80 may be configured in a chip of various devices related to image processing, such as aircraft, cell monitoring devices, vehicle monitoring devices, or robots. The chip may be an image processing chip, such as an image processing chip disposed in the aircraft. The aircraft may be any type of aircraft, such as an unmanned aerial vehicle, or an unmanned ship. The following takes an unmanned aerial vehicle as an example of the aircraft.

Referring to FIG. 8, the image data processing apparatus 80 includes a receiving module 801, a splitting processing module 802, a format conversion module 803, and a depth map obtaining module 804.

The receiving module 801 is configured to receive K channels of image data.

The K channels of image data include L channels of second image data obtained by combining M channels of first image data of the N channels of first image data and (N−M) channels of first image data in the N channels of first image data that have not undergone combining processing, and K<N.

K, N, M, and L are all positive integers, and K=L+N−M. In addition, K is less than or equal to a maximum number of input channels of image data that can be supported.

It should be noted that specific values of K, N, M, and L are not limited herein, and can be set according to requirements in order to adapt to different image data processing requirements.

For example, taking the obstacle avoidance of a aircraft such as an unmanned aerial vehicle as an example, to implement the comprehensive obstacle avoidance of the unmanned aerial vehicle, obstacle avoidance usually requires supporting six directions: front, bottom, rear, left, right, and top. Therefore, six pairs of or 12 image acquisition devices are usually needed, that is, N=12 is desirable in this case.

However, due to the limitations of the image processing chip itself, the number of channels of image data that the receiving module 801 thereof can receive is limited. Usually, the maximum number of input channels supported by an advanced chip is only about 8 channels, that is, in this case, the maximum number of input channels of image data supported by the receiving module 801 can be 8, and the value range of K is K<8, for example, K=4, 5, 6, 7, or the like.

After M channels of the N channels of first image data are combined, the receiving module 801 may receive K channels of image data for subsequent image data processing by the splitting processing module 802, the format conversion module 803, and the depth map obtaining module 804.

The first image data may be raw data. The raw data is unprocessed data, or may be understood as raw data used for an image acquisition apparatus to convert a captured light source signal into a digital signal.

The splitting processing module 802 is configured to perform splitting processing on the L channels of second image data in the K channels of image data to obtain M channels of third image data.

The L channels of second image data may include: a first channel of second image data, a second channel of second image data, . . . , and an $L^{th}$ channel of second image data. The first channel of second image data, the second channel of second image data, . . . , and the $L^{th}$ channel of second image data represent the first channel of second image data to the $L^{th}$ channel of second image data.

In some implementations, the splitting processing module 802 is specifically configured to: separately perform the splitting processing on the first channel of second image data, the second channel of second image data, . . . , and the $L^{th}$ channel of second image data row by row, to obtain the M channels of third image data.

Each channel of second image data is split into M/L channels of third image data.

For example, it is assumed that M=8 and L=2, one channel of second image data is split into four channels of third image data.

In some implementations, the first channel of second image data is split into a first channel of third image data, a second channel of third image data, . . . , and an $(M/L)^{th}$ channel of third image data.

In addition, the first channel of second image data includes P rows of image data. P is a positive integer, and a specific value of P is not limited herein, and can be set according to requirements in order to adapt to different image data processing requirements, for example, P=12.

In some implementations, the splitting processing module 802 performing the splitting processing on the first channel of second image data row by row includes:

disassembling a first row of image data, a second row of image data, . . . , and an $(M/L)^{th}$ row of image data of the first channel of second image data into a first row of the first channel of third image data, a first row of the second channel of third image data, . . . , and a $1^{st}$ row of the $(M/L)^{th}$ channel of third image data, respectively; disassembling an $(M/L+1)^{th}$ row of image data, an $(M/L+2)^{th}$ row of image data, . . . , and $(2*M/L)^{th}$ row of image data of the first channel of second image data into a second row of the first channel of third image data, a second row of the second channel of third image data, . . . , and a second row of the $(M/L)^{th}$ channel of third image data, respectively; and performing the operation by analogy, until a $(P-M/L+1)^{th}$ row of image data, a $(P-M/L+2)^{th}$ row of image data, . . . , and a $P^{th}$ row of image data of the first channel of second image data is disassembled into a $(P/(M/L))^{th}$ row of the first channel of third image data, a $(P/(M/L))^{th}$ row of the second channel of third image data, and a $(P/(M/L))^{th}$ row of the $(M/L)^{th}$ channel of third image data, respectively.

The format conversion module 803 is configured to perform format conversion processing on the (N−M) channels of first image data and the M channels of third image data to obtain a color image in a preset format.

The preset format may include a YUV format. The color image in the YUV format is divided into three components, respectively, a "Y" component, a "U" component, and a "V" component. The "Y" component represents luminance or luma, that is, a gray value; the "U" component and the "V" component represent chrominance or chroma, which is used to describe the color and saturation of the image and specify the color of the pixel.

In some implementations, both the first image data and the third image data are images in an RGB format, that is, format conversion processing performed by the format conversion module 803 may be converting an image in an RGB format into a color image in a YUV format.

A calculation formula for the gray part component Y in the color image in the preset format, that is, the "Y" component of the color image in the YUV format, is as follows:

$$Y=((66*R+129*G+25*B+128)/256+16)*16$$

where R is an intensity of a red component of the image in the RGB format, G is an intensity of a green component of the image in the RGB format, and B is an intensity of a blue component of the image in the RGB format.

The depth map obtaining module 804 is configured to perform image processing on a gray part component of the color image in the preset format to obtain a depth map.

A gray value of each pixel point of the depth map may be used to characterize a distance from an image acquisition device at a certain point in the scene corresponding to the acquired image data.

The depth map obtaining module 804 may use a binocular stereo vision method to obtain a depth map. By using the binocular stereo vision method, two images of a same scene are simultaneously acquired through two image acquisition devices (such as two rear-view lenses) separated by a distance, corresponding pixels in two images are found by a stereo matching algorithm, and then parallax information is calculated according to the triangle principle. In addition, the parallax information, through transformation, can be used for representing the depth map of an object in the scene.

In an application of obstacle avoidance of an unmanned aerial vehicle, distance information between the unmanned aerial vehicle and an obstacle can be determined by using the depth map, so as to determine a subsequent flight direction and flight channel of the unmanned aerial vehicle and avoid a collision between the unmanned aerial vehicle and the obstacle.

It should be noted that, in the embodiments of the present invention, the image data processing apparatus 80 may execute the image data processing method provided by any method embodiment, and has corresponding functional modules and beneficial effects for executing the method. For the technical details not described in detail in the embodiment of the image data processing apparatus 80, reference may be made to the image data processing method provided by the method embodiments.

Embodiment 3

Figure 9:
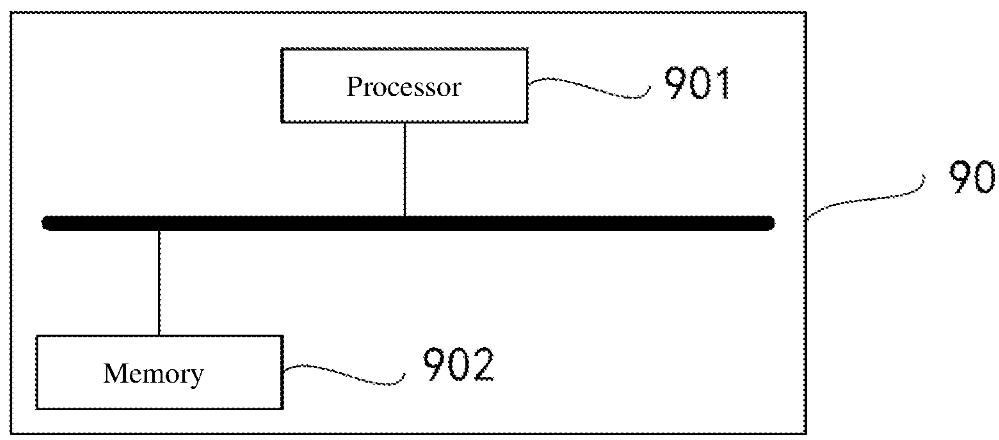
FIG. 9 is a schematic diagram of a hardware structure of an image processing chip according to an embodiment of the present invention.

FIG. 9 is a schematic diagram of a hardware structure of an image processing chip according to an embodiment of the present invention. The image processing chip may be various types of chips, such as a microprocessor, a micro control unit, a single chip microcomputer, a controller, and the like. As shown in FIG. 9, the image processing chip 90 includes:

one or more processors 901 and a memory 902, and one processor 901 is used as an example in FIG. 9.

The processor 901 and the memory 902 may be connected via a bus or other methods, and being connected via a bus is used as an example in FIG. 9.

The memory 902 serves as a non-volatile computer-readable storage medium, which may be configured to store non-volatile software programs, non-volatile computer executable programs, and modules, such as the program instructions/modules (for example, the receiving module 801, the splitting processing module 802, the format conversion module 803, and the depth map obtaining module 804 shown in FIG. 8) corresponding to the image data processing method in embodiments of the present invention. The processor 901 runs the non-volatile software programs, instructions, and modules stored in the memory 902, to execute various functional applications and data processing of the image processing chip, that is, implementing the image data processing method in the above-mentioned method embodiments.

The memory 902 may include a program storage area and a data storage area. The program storage area may store an operating system and an application program required for at least one function. The data storage area may store data created during use of the image processing chip and the like. In addition, the memory 902 may include a high-speed random access memory, and may further include a non-volatile memory such as at least one disk storage device, a flash memory device, or other non-volatile solid-state storage devices.

In some embodiments, the memory 902 may Alternatively include memories remotely disposed with respect to the processor 901, and these memories may be connected to the processor 901 via a network. Embodiments of the networks include, but are not limited to, the Internet, an intranet, a local area network, a mobile communication network, or a combination thereof.

One or more modules are stored in the memory 902, and when executed by the one or more processors 901, the image data processing method in the arbitrary method embodiment is executed, for example, step 301 to step 304 of the method described in FIG. 3, to implement the functions of the modules 801 to 804 in FIG. 8.

The image processing chip 90 may execute the image data processing method provided by the method embodiments, and has corresponding functional modules and beneficial effects for executing the method. For the technical details not described in detail in the embodiment of the image processing chip, reference may be made to the image data processing method provided by the method embodiments of the present invention.

The embodiments of the present invention provide a computer program product. The computer program product includes a computer program stored on a non-volatile computer-readable storage medium. The computer program includes program instructions, and the program instructions, when executed by a computer, cause the computer to perform the image data processing method described above. For example, the functions of modules 801 to 804 in FIG. 8 are implemented by performing step 301 to step 304 of the method described in FIG. 3

The embodiments of the present invention provide a non-volatile computer-readable storage medium, storing computer-executable instructions, which are used for causing a computer to perform the image data processing method described above. For example, the functions of modules 801 to 804 in FIG. 8 are implemented by performing step 301 to step 304 of the method described in FIG. 3

Embodiment 4

Figure 10:
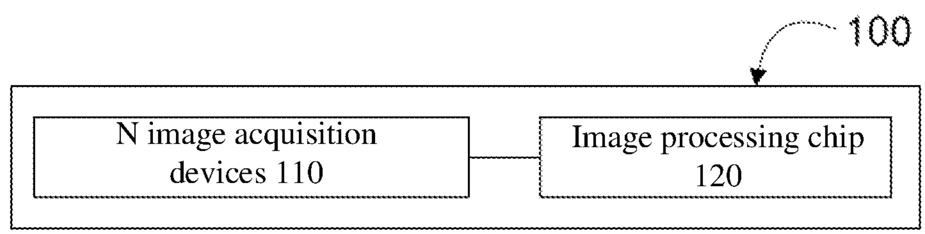
FIG. 10 is a schematic diagram of an aircraft according to an embodiment of the present invention.

FIG. 10 is a schematic diagram of a aircraft according to an embodiment of the present invention. The aircraft 100 includes: a vehicle body (not shown), N image acquisition devices 110 disposed on the vehicle body, and an image processing chip 120 disposed in the vehicle body.

The vehicle body may include a center frame and one or more arms connected to the center frame, and the one or more arms extend from the center frame in a radial shape. The number of arms may be 2, 4, 6, or the like. The one or more arms are configured to carry a power system.

The image processing chip 120 is connected to the N image acquisition devices 110. The N image acquisition devices 110 are configured to acquire N channels of first image data. The N image acquisition devices 110 may be a plurality of image acquisition devices 12 in FIG. 1 or FIG. 2, and the image processing chip 120 may be an image processing chip 90 in FIG. 9.

It should be noted that the technical details of the N Image acquisition devices 110 and the image processing chip 120 that are not described in detail in the embodiment of the present invention can be referred to the specific description of the above-mentioned embodiments, and therefore, the details will not be repeated herein.

In some implementations, the N image acquisition devices 110 include: two parallel-mounted front-view lenses, two parallel-mounted down-view lenses, two parallel-mounted rear-view lenses, two parallel-mounted up-view lenses, two parallel-mounted left-view lenses, and two parallel-mounted right-view lenses.

Due to the limitations of the image processing chip 120 itself, the number of channels of image data that can be received is limited. When the number (N) of channels of the first image data to be processed is greater than the number of channels of the image data that can be received by the image processing chip 120, to implement the processing of the N channel image data, combining processing may be performed on some channels of first image data before inputting the N channels of image data to the image processing chip 120, so that when the number of channels of image data to be processed is greater than the number of channels of image data that can be received by the image processing chip 120, the processing of the N channels of first image data can still be implemented by the image processing chip 120.

The image processing chip 120 receiving K channels of image data includes: receiving four channels of first image data that are acquired by the two parallel-mounted front-view lenses and the two parallel-mounted down-view lenses and have not undergone combining processing; and receiving one channel of second image data obtained by combining data acquired by the two parallel-mounted rear-view lenses and the two parallel-mounted up-view lenses; and receiving one channel of second image data obtained by combining data acquired by the two parallel-mounted left-view lenses and the two parallel-mounted right-view lenses.

Figure 11:
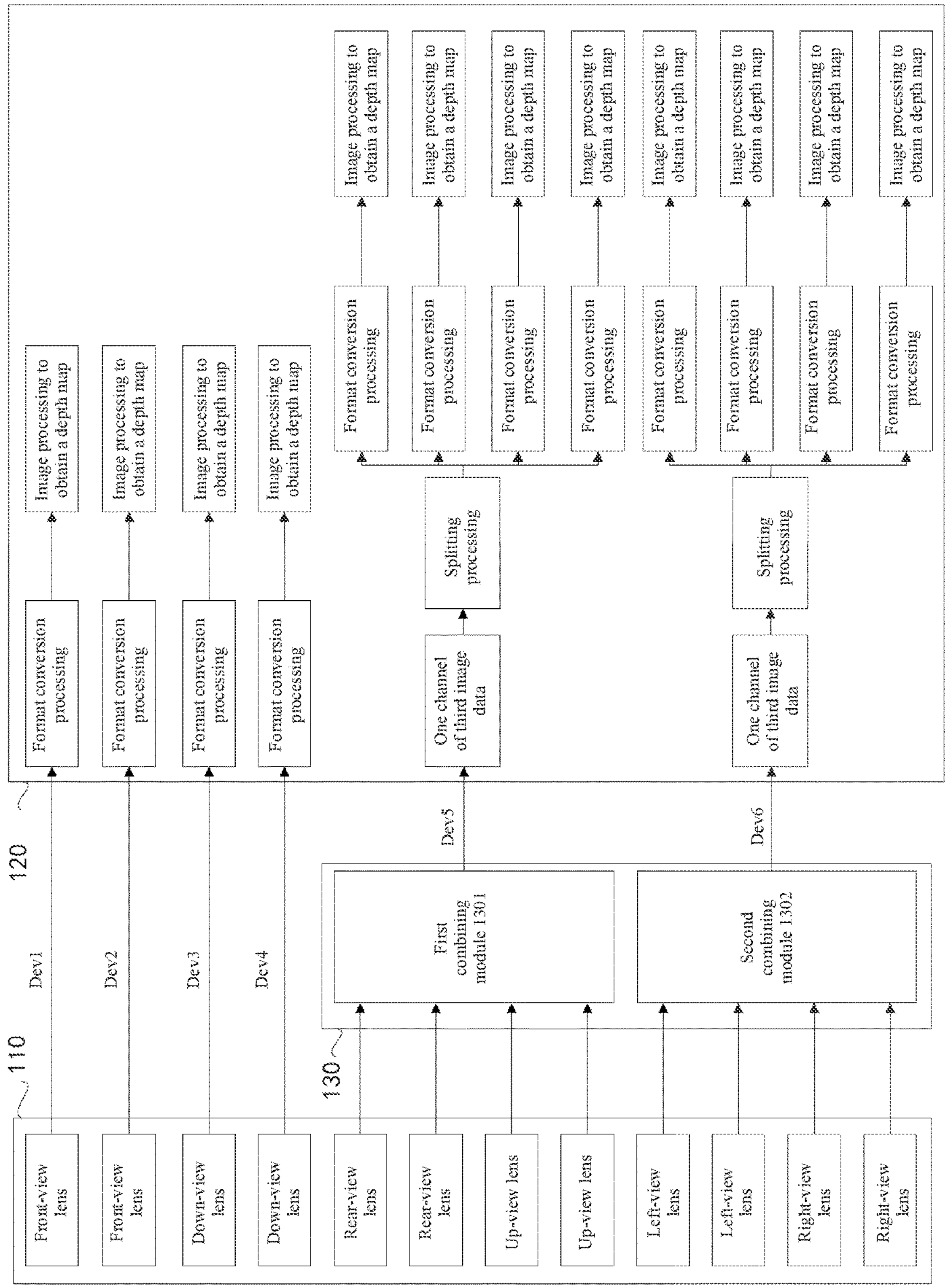
FIG. 11 is a schematic diagram of another aircraft according to an embodiment of the present invention.

In some embodiments, as shown in FIG. 11, the aircraft 100 further includes L combining modules 130. Input ends of the L combining modules 130 are connected to M image acquisition devices configured to acquire M channels of first image output ends of the L combining modules 130 are connected to the image processing chip 120, and the L combining modules 130 are configured to combine N channels of first image data of the M channels of first image data.

In some implementations, as shown in FIG. 11, the L combining modules 130 include a first combining module 1301 and a second combining module 1302.

An input end of the first combining module 1301 is connected to the two parallel-mounted rear-view lenses and the two parallel-mounted up-view lenses, and an output end of the first combining module 1301 is connected to the image processing chip 120. The first combining module 1301 is configured to combine four channels of first image data acquired by the two parallel-mounted rear-view lenses and the two parallel-mounted up-view lenses.

An input end of the second combining module 1302 is connected to the two parallel-mounted left-view lenses and the two parallel-mounted right-view lenses, and an output end of the second combining module 1302 is connected to the image processing chip 120. The second combining module 1302 is configured to combine four channels of first image data acquired by the two parallel-mounted left-view lenses and the two parallel-mounted right-view lenses.

It is assumed that K=6, a specific process for the image processing chip 120 to acquire the K channels of image data is as follows.

1. Two parallel-mounted front-view lenses acquire two channels of first image data, where the acquisition of the image data is triggered synchronously, and after the two parallel-mounted front-view lenses each acquire a frame of first image data at the same time, the frames of first image data are sent to the image processing chip 120 through an input device Dev1 and an input device Dev2, respectively, to obtain two channels of first image data.

2. The process for the image processing chip 120 to obtain two channels of first image data acquired by two parallel-mounted down-view lenses is similar to the process of obtaining the two channels of first image data acquired by the two parallel-mounted front-view lenses, and therefore will not be described herein.

3. Two parallel-mounted rear-view lenses and two parallel-mounted up-view lenses acquire four channels of first image data, and the four channels of first image data are combined by the first combining module 1301 and then sent to the image processing chip 120 through an input device Dev5, to obtain one channel of second image data.

4. Two parallel-mounted left-view lenses and two parallel-mounted right-view lenses acquire four channels of first image data, and the four channels of first image data are combined by the second combining module 1302 and then sent to the image processing chip 120 through an input device Dev6, to further obtain one channel of second image data.

To sum up, the K channels of image data obtained by the image processing chip 120 include four channels of first image data and two channels of second image data.

Figure 12:
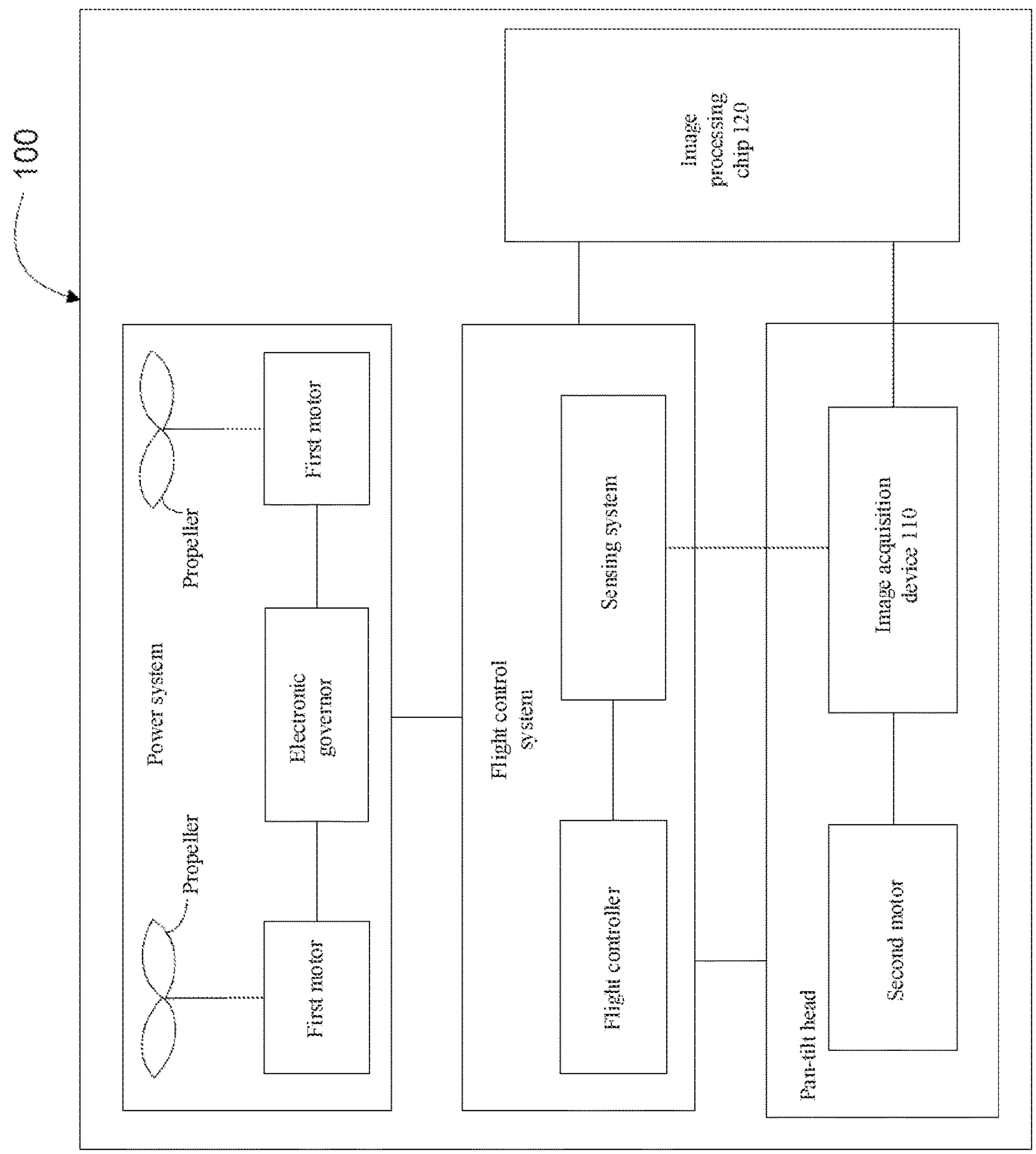
FIG. 12 is a schematic diagram of another aircraft according to an embodiment of the present invention.

The aircraft 100 is an air carrier. To implement the flight of the aircraft 100, the aircraft 100 further includes related components to implement the flight function. For example, as shown in FIG. 12, the aircraft 100 further includes a power system, a flight control system, a pan-tilt head, or the like.

The flight control system is disposed in the vehicle body, the power system and the pan-tilt head are both mounted on the vehicle body, and the N image acquisition devices 110 are respectively mounted on the corresponding pan-tilt heads. The flight control system may be coupled to the power system, the pan-tilt heads, and the image processing chip 120, for implementing communication.

The power system may include an electronic governor (EG for short), one or more propellers, and one or more first motors corresponding to the one or more propellers.

The first motors are connected between the electronic governors and the propellers, and the first motors and the propellers are disposed on the corresponding arms. The first motors are configured to drive the propellers to rotate, thereby providing power for the flight of the aircraft 100, and the power enables the aircraft 100 to implement one or more degrees of freedom of movement, such as forward and backward movement, up and down movement, or the like. In some embodiments, the aircraft 100 may rotate about one or more rotation axes. For example, the rotation axes may include a horizontal roll axis, a translation axis, and a pitch axis.

It can be understood that the first motors may be DC motors or AC motors. In addition, the first motors may be brushless motors or brush motors.

The electronic governors are configured to receive drive signals generated by the flight control system, and provide drive currents to the first motors according to the drive signals to control rotation speeds of the first motors, thereby controlling the flight of the aircraft 100.

The flight control system has the capability of monitoring and manipulating the flight and tasks of the aircraft 100, and includes a set of devices for launch and recovery control of the aircraft 100. The flight control system is configured to control the flight of the aircraft 100. The flight control system may include a sensing system and a flight controller.

The sensing system is configured to measure position information and state information of the aircraft 100 and various components of the aircraft 100, for example, a three-dimensional position, a three-dimensional angle, a three-dimensional velocity, a three-dimensional acceleration, a three-dimensional angular velocity, a flight height, or the like.

The sensing system may include at least one of an infrared sensor, an acoustic sensor, a gyroscope, an electronic compass, an Inertial Measurement Unit (IMU), a vision sensor, a global navigation satellite system, and a barometer. For example, the global navigation satellite system may be the Global Positioning System (GPS).

The flight controller is configured to control the aircraft 100, such as controlling the flight or photography of the aircraft 100. It can be understood that the flight controller may control the aircraft 100 in accordance with pre-programmed instructions or may control the aircraft 100 in response to one or more control instructions from other devices.

For example, a remote control is connected to the flight controller and the remote control sends a control instruction to the flight controller, so that the flight controller controls the aircraft 100 based on the control instruction. For example, taking the flight control of the aircraft 100 as an example, the flight controller sends the control instruction to the electronic governors to generate drive signals, and provides drive currents to the first motors according to the drive signals to control the rotational speed of the first motors, thereby controlling the flight of the aircraft 100.

As photographing auxiliary devices, the pan-tilt heads are configured to carry the N image acquisition devices 110. Second motors are disposed on the pan-tilt heads, and the flight control system may control the pan-tilt heads. Specifically, the flight control system controls motions (such as rotation speeds) of the second motors to adjust angles at which the N image acquisition devices photograph images. In addition, the second motors may be brushless motors or brush motors. The pan-tilt heads may be located at the top or bottom of the vehicle body.

In addition, in this embodiment of the present invention, the pan-tilt heads may be part of the aircraft 100, and it can be understood that, in some other embodiments, the pan-tilt heads may be independent of the aircraft 100.

It can be understood that the above designation of the components of the aircraft 100 is for identification purposes only and should not be construed as limiting to the embodiments of the present invention.

It should be noted that, the apparatus embodiments described above are merely illustrative, where the modules illustrated as separate components may or may not be physically separated, and the components displayed as modules may or may not be physical modules, that is, may be located in one location, or may be distributed over a plurality of network modules. Some or all of the modules can be selected according to the actual needs to achieve the purpose of this embodiment.

From the above description of the embodiments, it would be clear to those of ordinary skill in the art that the embodiments may be implemented by means of software plus a common hardware platform and certainly also may be implemented by means of hardware. As it would be understood by those of ordinary skill in the art, all or part of the process of implementing the above-mentioned embodiment methods can be accomplished by instructing related hardware through a computer program, the program can be stored in a computer readable storage medium, and the program, when executed, can include the process of the embodiments of the above-mentioned methods. The storage medium may be a magnetic disk, an optical disk, a Read-Only Memory (ROM), a Random Access Memory (RAM), or the like.

Finally, it should be noted that the above embodiments are only used to illustrate the technical solutions of the present invention, but not to limit it. In the spirit of the present invention, the technical features of the above embodiments or different embodiments may also be combined, the steps may be carried out in any order, and there are many other variations of the different aspects of the present invention as described above, which are not provided in detail for brevity. Although the present invention has been described in detail with reference to the foregoing embodiments, it should be understood solutions by those of ordinary skill in the art that the technical solution described in the foregoing embodiments can still be modified or some technical features thereof can be equivalently replaced. These modifications or substitutions do not depart the essence of the corresponding technical solutions from the scope of the technical solutions of the embodiments of the present invention.

What is claimed is:

1. An image data processing method, applicable to process N channels of first image data acquired by N image acquisition devices, the method comprises:

receiving K channels of image data, wherein the K channels of image data comprise L channels of second image data obtained by combining M channels of first image data of the N channels of first image data and (N-M) channels of first image data in the N channels of first image data that have not undergone combining processing, and K<N;

performing splitting processing on the L channels of second image data in the K channels of image data to obtain M channels of third image data;

performing format conversion processing on the (N-M) channels of first image data and the M channels of third image data to obtain a color image in a preset format; and performing image processing on a gray part component of the color image in the preset format to obtain a depth map.

2. The method according to claim 1, wherein K is less than or equal to a maximum number of channels of image data that are supported to input.

3. The method according to claim 1, wherein the L channels of second image data comprise: a first channel of second image data, a second channel of second image data, . . . , and an $L^{th}$ channel of second image data; and the performing splitting processing on the L channels of second image data in the K channels of image data comprises:

separately performing the splitting processing on the first channel of second image data, the second channel of second image data, . . . , and the $L^{th}$ channel of second image data row by row, wherein each channel of second image data is split into M/L channels of third image data.

4. The method according to claim 3, wherein the first channel of second image data is split into a first channel of third image data, a second channel of third image data, . . . , and an $(M/L)^{th}$ channel of third image data, and the first channel of second image data comprises P rows of image data; and the performing the splitting processing on the first channel of second image data row by row comprises:

disassembling a first row of image data, a second row of image data, and an $(M/L)^{th}$ row of image data of the first channel of second image data into a first row of the first channel of third image data, a first row of the second channel of third image data, . . . , and a $1^{st}$ row of the $(M/L)^{th}$ channel of third image data, respectively; disassembling an (M/L+1)th row of image data, an $(M/L+2)^{th}$ row of image data, and $(2*M/L)^{th}$ row of image data of the first channel of second image data into a second row of the first channel of third image data, a second row of the second channel of third image data, and a second row of the $(M/L)^{th}$ channel of third image data, respectively; and performing the operation by analogy, until a (P-M/L+1)th row of image data, a (P-M/L+2)th row of image data, . . . , and a Pth row of image data of the first channel of second image data is disassembled into a $(P/(M/L))^{th}$ row of the first channel of third image data, a $(P/(M/L))^{th}$ row of the second channel of third image data, and a $(P/(M/L))^{th}$ row of the $(M/L)^{th}$ channel of third image data, respectively.

5. The method according to claim 1, wherein the preset format comprises: a YUV format.

6. The method according to claim 5, wherein the first image data and the third image data are both images in an RGB format, and a calculation formula of the gray part component of the color image in the preset format is:

$$Y=((66*R+129*G+25*B+128)/256+16)*16$$

wherein R is an intensity of a red component of the image in the RGB format, G is an intensity of a green component of the image in the RGB format, and B is an intensity of a blue component of the image in the RGB format.

7. An image data processing apparatus, applicable to process N channels of first image data acquired by N image acquisition devices, wherein the apparatus comprises a processor and a memory communicatively connected to the processor, the memory storing computer program instructions, the computer program instructions, when invoked by the processor, causing the processor to perform the following steps:

receiving K channels of image data, wherein the K channels of image data comprise L channels of second image data obtained by combining M channels of first image data of the N channels of first image data and (N-M) channels of first image data in the N channels of first image data that have not undergone combining processing;

performing splitting processing on the L channels of second image data in the K channels of image data to obtain M channels of third image data;

performing format conversion processing on the (N-M) channels of first image data and the M channels of third image data to obtain a color image in a preset format; and performing image processing on a gray part component of the color image in the preset format to obtain a depth map.

8. The apparatus according to claim 7, wherein K is less than or equal to a maximum number of channels of image data that are supported to input.

9. The apparatus according to claim 7, wherein the L channels of second image data comprise: a first channel of second image data, a second channel of second image data, and an $L^{th}$ channel of second image data; and the processor is further configured to:

separately perform the splitting processing on the first channel of second image data, the second channel of second image data, and the $L^{th}$ channel of second image data row by row, to obtain the M channels of third image data, wherein each channel of second image data is split into M/L channels of third image data.

10. The apparatus according to claim 9, wherein the first channel of second image data is split into a first channel of third image data, a second channel of third image data, . . . , and an $(M/L)^{th}$ channel of third image data, and the first channel of second image data comprises P rows of image data; and the splitting processing module performing the splitting processing on the first channel of second image data row by row comprises:

disassembling a first row of image data, a second row of image data, . . . , and an $(M/L)^{th}$ row of image data of the first channel of second image data into a $1^{st}$ row of the first channel of third image data, a $1^{st}$ row of the second channel of third image data, . . . , and a $1^{st}$ row of the $(M/L)^{th}$ channel of third image data, respectively; disassembling an $(M/L+1)^{th}$ row of image data, an $(M/L+2)^{th}$ row of image data, . . . , and $(2*M/L)^{th}$ row of image data of the first channel of second image data into a second row of the first channel of third image data, a second row of the second channel of third image data, and a second row of the $(M/L)^{th}$ channel of third image data, respectively; and performing the operation by analogy, until a $(P-M/L+1)^{th}$ row of image data, a $(P-M/L+2)^{th}$ row of image data, . . . , and a $P^{th}$ row of image data of the first channel of second image data is disassembled into a $(P/(M/L))^{th}$ row of the first channel of third image data, a $(P/(M/L))^{th}$ row of the second channel of third image data, and a $(P/(M/L))^{th}$ row of the $(M/L)^{th}$ channel of third image data, respectively.

11. The apparatus according to claim 7, wherein the preset format comprises: a YUV format.

12. The apparatus according to claim 11, wherein the first image data and the third image data are both images in an RGB format, and a calculation formula of the gray part component Y of the color image in the preset format is:

$$Y=((66*R+129*G+25*B+128)/256+16)*16$$

wherein R is an intensity of a red component of the image in the RGB format, G is an intensity of a green component of the image in the RGB format, and B is an intensity of a blue component of the image in the RGB format.

13. An image processing chip, comprising:

at least one processor; and a memory in communication connection with the at least one processor, wherein the memory stores instructions capable of being executed by the at least one processor, and the instructions, when executed by the at least one processor, cause the at least one processor to perform the following steps:

receiving K channels of image data, wherein the K channels of image data comprise L channels of second image data obtained by combining M channels of first image data of the N channels of first image data and (N-M) channels of first image data in the N channels of first image data that have not undergone combining processing, and K<N;

performing splitting processing on the L channels of second image data in the K channels of image data to obtain M channels of third image data;

performing format conversion processing on the (N-M) channels of first image data and the M channels of third image data to obtain a color image in a preset format; and performing image processing on a gray part component of the color image in the preset format to obtain a depth map.

14. An aircraft, comprising a vehicle body, and further comprising N image acquisition devices disposed on the vehicle body and an image processing chip disposed in the vehicle body, wherein the image processing chip is connected to the N image acquisition devices, the N image acquisition devices are configured to acquire N channels of first image data, and the image processing chip comprising:

at least one processor; and a memory in communication connection with the at least one processor, wherein the memory stores instructions capable of being executed by the at least one processor, and the instructions, when executed by the at least one processor, cause the at least one processor to perform the following steps:

receiving K channels of image data, wherein the K channels of image data comprise L channels of second image data obtained by combining M channels of first image data of the N channels of first image data and (N-M) channels of first image data in the N channels of first image data that have not undergone combining processing, and K<N;

performing splitting processing on the L channels of second image data in the K channels of image data to obtain M channels of third image data;

performing format conversion processing on the (N-M) channels of first image data and the M channels of third image data to obtain a color image in a preset format; and performing image processing on a gray part component of the color image in the preset format to obtain a depth map.

15. The aircraft according to claim 14, wherein the N image acquisition devices comprise: two parallel-mounted front-view lenses, two parallel-mounted down-view lenses, two parallel-mounted rear-view lenses, two parallel-mounted up-view lenses, two parallel-mounted left-view lenses, and two parallel-mounted right-view lenses.

16. The aircraft according to claim 15, wherein the receiving K channels of image data further comprises:

receiving four channels of first image data that are acquired by the two parallel-mounted front-view lenses and the two parallel-mounted down-view lenses and have not undergone combining processing; and receiving one channel of second image data obtained by combining data acquired by the two parallel-mounted rear-view lenses and the two parallel-mounted up-view lenses; and receiving one channel of second image data obtained by combining data acquired by the two parallel-mounted left-view lenses and the two parallel-mounted right-view lenses.

17. The aircraft according to claim 16, wherein the aircraft further comprises L combining modules, input ends of the L combining modules are connected to M image acquisition devices configured to acquire M channels of first image data, output ends of the L combining modules are connected to the image processing chip, and the L combining modules are configured to combine N channels of first image data of the M channels of first image data.

18. The aircraft according to claim 17, wherein the L combining modules comprise a first combining module and a second combining module, an input end of the first combining module is connected to the two parallel-mounted rear-view lenses and the two parallel-mounted up-view lenses, an output end of the first combining module is connected to the image processing chip, an input end of the second combining module is connected to the two parallel-mounted left-view lenses and the two parallel-mounted right-view lenses, and an output end of the second combining module is connected to the image processing chip.

* * * * *